Aug. 8, 1950
A. CONSTANT
2,518,286
PROCESS OF AND APPARATUS FOR THE
MANUFACTURE OF FERTILIZERS
Filed Sept. 19, 1945
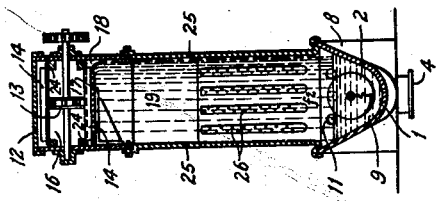
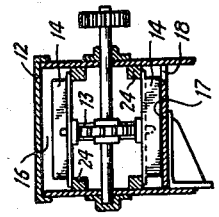
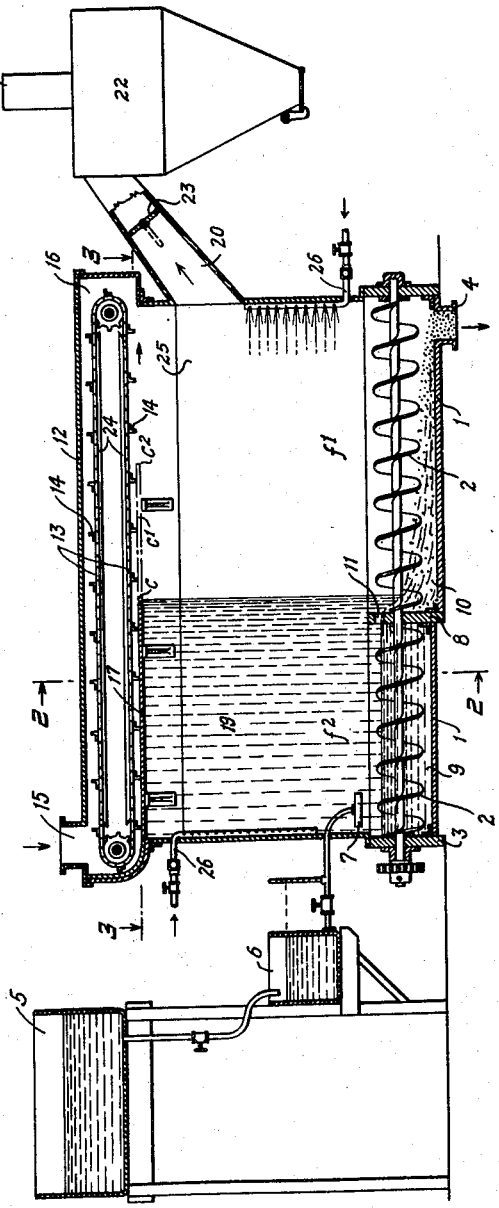
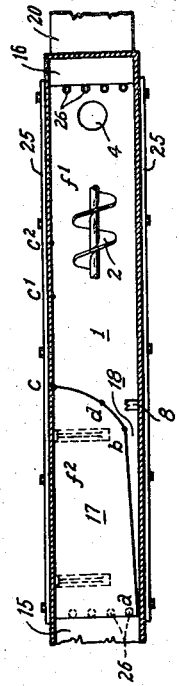
INVENTOR.
Antime Constant
Dale A. Bauer
ATTORNEY.

Patented Aug. 8, 1950

2,518,286

UNITED STATES PATENT OFFICE 2,518,286

PROCESS OF AND APPARATUS FOR THE MANUFACTURE OF FERTILIZERS

Antime Constant, Paris, France, assignor to Société Anonyme des Manufactures des Glaces et Produits Chimiques de Saint-Gobain, Chauny & Cirey, Paris, France Application September 19, 1945, Serial No. 617,241
In France March 6, 1942

Section 1, Public Law 690, August 8, 1946
Patent expires March 6, 1962

7 Claims. (Cl. 71—37)

This invention relates to a process of and apparatus for the manufacture of fertilizers by causing mixtures of sulphuric and nitric acids to react on phosphates.

It is already known to solubilize the $P_2O_5$ of phosphates by means of sulphonitric mixtures but this operation, if carried out under the conditions usually encountered in the manufacture of superphosphate, and without special precautions, is subject to serious difficulties.

On the one hand, the reactions occur much more rapidly when sulphonitric mixtures are employed instead of sulphuric acid alone.

On the other hand, whereas the temperatures of 100° to 110° C. currently attained in the course of mixing phosphates in the presence of acid do not present any difficulties when the acid is exclusively sulphuric acid, such is not the case when the acid is a sulphonitric mixture, even though it has but a small content in nitric acid. There are then produced abundant disengagements of volatile nitrogenous products, due to the high vapour tension of nitric acid above 50° C., its decomposition starting at about 85° C. and also the reducing action of certain secondary constituents of the phosphates. These disengagements not only make the material conduct of the reaction difficult, but furthermore, and in particular, they correspond to important losses of nitrogen.

My invention has for its object to provide an improved process for the manufacture of fertilizers which shall make it possible to carry out on a commercial scale the treatment of phosphates with sulphonitric mixtures while avoiding the disadvantages indicated above.

My invention has also for its object to provide an apparatus for the carrying out of said process.

The process according to my invention for the manufacture of phosphatic fertilizers by the action of sulphonitric mixtures on phosphates comprises feeding the sulphonitric acid mixture into one end of a mixing chamber, causing said mixture to progress in a continuous manner through said chamber, causing the phosphate to fall as a sheet through the chamber from a comparatively great height to produce at the surface of the mass under reaction a thin continuous, protective and absorbent crust or skin which is permanently kept up and which efficiently reduces the disengagement of the bubbles of nitrogenous vapors as these are formed, the falling phosphate forming above and over at least a part of the length of the mass under reaction a mist or fine and continuous rain which stops, absorbs and returns to the mixture any vapours which may have been able to pass through the said crust or skin.

My process may be preferably worked out as a continuous process.

According to one particular mode of carrying out my process, the distribution of the phosphate to the sulphonitric mixture is not uniform over the whole length of the chamber but varies in accordance with a certain law in such manner as to regulate the quantity of phosphate supplied to each region of the mass in reaction according to the intensity of the reactions and the evolution of gases which tends to occur.

The law for the distribution of the phosphate is characterised by the succession of an initial zone in which the average value of the delivery of phosphate is comparatively small and of a second zone in which a bulky delivery of phosphate takes place.

Furthermore, this law of distribution must take into account the nature of the phosphate treated and the desired percentage of solubilisation of its phosphoric acid.

In practice, the supply of phosphate to the sulphonitric mixture may take place, for example, in a uniform manner over a certain length starting from the inlet end of the mixing chamber and then rise to a maximum value which may be maintained or not to the end of the distribution.

In the application of these fundamental characteristics of my invention, one method consists, for example, in arranging the supply of sulphonitric mixture, the mixing apparatus and the distribution of phosphate in such manner that, in a first section at the inlet end of this apparatus, the sulphonitric mixture (while as cold as possible) receives a fraction only of the quantity of phosphate necessary for its neutralisation, this fraction, preferably, not being greater than 50%, and then, at the entry to the second section, the liquid product coming from the first section receives a delivery of phosphate which is sufficiently bulky to cause the mass to set very rapidly, the remainder of the phosphate being then distributed over a length of greater or less extent.

In the first section of the apparatus the phosphate introduced, being in the presence of an excess of sulphonitric acid, is rapidly attacked without the temperature rising dangerously; in the second section, the phosphate delivered being in larger quantity and being in the presence of a weakened acid, the risks of a rise of temperature continue to be very small. Under these conditions, the evolution of volatile nitrogenous products is appreciably reduced.

In addition, the fact that the reaction is carried out under the protection of a mist of phosphate forming a screen has the important advantages that complete salubrity of the working atmosphere is ensured and the prevention of the disengagement of nitrogenous vapours is combined with the chemical process of the operation. Actually, the screen of phosphate thus formed reacts with the nitrogenous vapors in such manner that the latter combine with the phosphate and fall back with it into the mass under reaction. These vapours thus help to solubilize a part of the $P_2O_5$ of the phosphate.

The absorbent action of the phosphate mist comprised between the distributor and the free surface of the mass under reaction is facilitated by the moisture present in the reaction space and the amount of which may, in case of need, be increased by the addition of saturated water vapour or by the atomisation of water into the said space.

Advantageously, the process according to the invention may be carried out as a whole in a slow manner. The apparatus required for carrying this process into effect is particularly simple and easily constructed.

There will now be described one non-limitative example of a suitable form of such apparatus, reference being had to the accompanying drawings, wherein:

Fig. 1 is a diagrammatic elevation, partly sectional showing the complete apparatus.

Fig. 2 is a section taken on the line 2—2 of Fig. 1.

Fig. 3 is a fragmentary sectional view on line 3—3 of Fig. 1.

Fig. 4 is a fragmentary cross-sectional view of the phosphate distributor, corresponding to the upper part of Fig. 2 but to a larger scale.

The process is preferably carried out, as shown in the example, in a mixing and kneading apparatus, such as a trough 1 of great length and large surface, in which is mounted an endless screw 2 arranged to traverse the mass under reaction along the trough from the inlet end 3 to the outlet end 4.

The sulphonitric acid mixture is supplied from a reservoir 5 and, after passing through a constant level tank 6, is introduced at 7 in a continuous manner into the inlet end of the trough 1. The latter is preferably divided by a partition 8 into two sections or compartments 9 and 10, so that the mass which forms in the first phase of the operation remains in the liquid state. Orifices 11 permit the mass under reaction to pass, at a suitable rate, from the section 9 into the section 10 where the second phase of the operation takes place.

The supply of phosphate is effected above the trough 1 over the whole or the greater part of the length thereof.

This supply is ensured by a scraper distributor comprising a chest 12 containing an endless chain or belt 13 provided with cross pieces, such as angle irons or flat plates 14, which carry the phosphate along from the inlet 15 at which it is introduced into the chest to the opposite end 16 of the latter.

The bottom 17 of the chest is constituted by a distributor plate which constitutes by itself an important feature of the invention.

This plate is cut out, for example, according to a profile $a, b, c$ in such manner as to permit the discharge of the phosphate according to a law of distribution determined by the characteristics previously pointed out. The quantity of phosphate delivered through the opening 18 into the first section 9 of the trough 1 is at first practically very small and uniformly spread over the distance between the perpendiculars at $a$ and $b$. The quantity delivered through the opening 18 then rises to a maximum value at $c$, approximately vertically above the inlet for the reaction mass into the second section 10 of the trough, which value may or may not be maintained throughout the remainder of the length to the point at which distribution of the phosphate is terminated. This point, moreover, need not be located vertically above the outlet end of the trough since the introduction of the phosphate may be arranged to terminate at a greater or lesser distance from this outlet and, dependent, primarily upon whether it is desired to manufacture products having a solubilisation as advanced as that of the superphosphates or, on the contrary, products which are but slightly solubilised. The profile of the distributor plate may be varied if it is desired to obtain, in the second phase of the operation, a less heavy discharge of phosphate on to the reaction mass.

A height of fall of about 1.50 m. between the bottom of the distributor and the top of the trough 1 is suitable for the application of the process.

The mist formed at 19 by the bulk discharge of the powdered phosphate absorbs and returns to the reaction mass the gaseous bubbles which rise, according to the arrows $f^1$ and $f^2$, from the sections 9 and 10 of the trough.

Any vapours which may have passed through this mist are evacuated through a conduit 20 to a chimney 21, it being advantageous to interpose a settling chamber 22 of large cross-section in the path of the vapours to collect the finer phosphate powders which may be carried along therewith. A damper 23 may be employed to regulate the sub-pressure in the closed space between the distributor and the trough, which should be slight. This sub-pressure may be produced either by natural draught or by a fan.

The construction of the whole apparatus may naturally vary in details without departing from the scope of the present invention.

In particular, slides 24 will advantageously ensure the correct route of the scrapers 14 at the inlet of the chest 12.

The panels 25, which are preferably wholly or partially removable, ensure the enclosure of the space through which the phosphate is to fall.

Rows of inlets 26 for saturated water vapour or water under pressure permit of humidifying the atmosphere of the enclosed space, if this should be necessary.

The endless screw 2 and the distributor 13—14 may be driven mechanically by any suitable means.

The product obtained by the application of the invention presents the advantage that it can be manipulated and delivered much more rapidly than a superphosphate; actually, its manufacture is more rapid, and also the time required for it to mature is greatly reduced, compared with superphosphates.

The process according to the invention presents the great advantage of permitting, with minimum losses of nitrogen, the industrial manufacture of nitric phosphatic fertilizers having a variable degree of solubilisation, starting from sulphonitric mixtures of variable composition.

Naturally, the product obtained may be associated with advantage with other fertilizers, principally those containing nitrogen and potassium, to form compound or complex fertilizers. These fertilizing agents are added either at the end of the mixing trough or after the product has left the latter, or, again, according to their nature, they are mixed, wholly or in part, with the phosphate, or they may be dissolved in the sulphonitric acid mixture itself. The supply of certain additional fertilizing agents in the course of the manufacture itself presents the advantage of reducing the liveliness of the reactions and of diminishing the disengagements of nitrogenous vapours which might still tend to be produced.

What is claimed is:

1. Apparatus for the manufacture of a fertilizer including an enclosure comprising a trough, a perforated transverse partition therein, means to admit a liquid to the trough at one side of the partition, means to withdraw contents from the trough at the other side of the partition, means comprising a helical conveyor to move the contents along the trough, means to deliver finely divided material to the trough comprising a scraper conveyor having a floor cut away to provide an opening of progressively differing size that permits the fall of material in accordance with particular requirements of density, means to enclose the falling material, means to humidify the enclosed space, and means to draw gases gently from the enclosed space and to clean them.

2. In a chemical process that includes the step of immersing a solid reactant in a bath of a liquid reactant and that includes the evolution of a gas having ingredients of value in the reaction product, the step of passing said evolved gas through a rain of the powdered solid whereby to return some of said gas to the reaction mass.

3. A process for the manufacture of phosphatic fertilizers by the action of mixed sulfuric and nitric acid on phosphates of the kinds employed as raw materials in the manufacture of fertilizer which comprises flowing the acid mixture in a stream through an enclosure comprising a falling curtain of powdered phosphate of substantial length and of density sufficient to intercept and capture nitrogen oxide gases escaping from the reaction mixture.

4. A process for the manufacture of phosphatic fertilizers by the action of a nitric and sulfuric acid mixture on phosphates of the kind employed as raw materials in the manufacture of fertilizers which comprises flowing the acid mixture as a stream, enclosing a substantial length of said stream within a boundary including a curtain of falling phosphate of substantial length, the curtain being positioned to intercept gases escaping from within said boundary, and the quantity of phosphate in said curtain being sufficient to form and maintain a crust on the part of the surface of the stream that is adjacent the sheet of falling phosphate.

5. An apparatus for the manufacture of phosphatic fertilizers by the action of sulfuric and nitric acid mixtures on phosphates of the kind employed in making fertilizers, which comprises an enclosure including a mixing trough and a gas outlet, inlet means to supply the mixed acids to the trough, and elongated distributor means constructed and arranged to feed powdered phosphate from a height in the form of a curtain extending between a portion of the trough in which material evolution of nitrogen oxide gases takes place and the said gas outlet.

6. A process for the manufacture of phosphatic fertilizers by the action of mixed sulfuric and nitric acids which comprises continuously feeding the mixed acid into an enclosed channel of substantial length divided into two zones into contact with finely divided phosphatic material, continuously mixing and progressing the mixture through the first zone, feeding said phosphatic material from a height so that it freely falls in progressively increasing amounts into the mixture along the length of said first zone and passing the mixture to the second zone for recovery of the fertilizer product, said freely falling particles presenting a curtain, in falling, extending across the enclosure between the first and second zones.

7. Apparatus for the manufacture of a fertilizer including an enclosed trough, a transverse partition in said trough having an opening above the bottom of said trough, means to admit a liquid at one end of the trough, means comprising a helical conveyor to move the contents along the trough, means to deliver a finely divided material to the trough comprising a distributor plate above the trough and a scraper conveyor contacting said plate, said plate being cut away to present a curvilinear edge permitting the fall of material thereover in relatively increasing amounts.

ANTIME CONSTANT.

REFERENCES CITED

The following references are of record in the file of this patent:

UNITED STATES PATENTS

| Number | Name | Date |
|---|---|---|
| 855,745 | Argall | June 4, 1907 |
| 997,968 | Cusatelli | July 18, 1911 |
| 1,745,291 | Bleil | Jan. 28, 1930 |
| 1,840,294 | Richards | Jan. 5, 1932 |
| 2,106,223 | Nordengrin | Jan. 25, 1938 |
| 2,140,471 | Frolich et al. | Dec. 13, 1938 |
| 2,148,998 | Sackett | Feb. 28, 1939 |
| 2,240,841 | Flynn | May 6, 1941 |

FOREIGN PATENTS

| Number | Country | Date |
|---|---|---|
| 5,009 | Great Britain | 1898 |
| 243,192 | Great Britain | Nov. 26, 1925 |